(No Model.)

J. KREHBIEL.
CULINARY STEAMER.

No. 263,049. Patented Aug. 22, 1882.

Witnesses:
Will. O. Stark
Al. Stark

Inventor:
John Krehbiel, M.D.
by Michael J. Stark,
Attorney.

UNITED STATES PATENT OFFICE.

JOHN KREHBIEL, OF LOCKPORT, NEW YORK, ASSIGNOR TO SARAH N. KREHBIEL, OF SAME PLACE.

CULINARY STEAMER.

SPECIFICATION forming part of Letters Patent No. 263,049, dated August 22, 1882.

Application filed June 14, 1882. (No model.)

*To all whom it may concern:*

Be it known that I, JOHN KREHBIEL, of Lockport, in the county of Niagara and State of New York, have invented certain new and useful Improvements on a Culinary Steamer; and I do hereby declare that the following description of my said invention, taken in connection with the accompanying sheet of drawings, forms a full, clear, and exact specification, which will enable others skilled in the art to which it appertains to make and use the same.

This invention has general reference to culinary steamers; and it consists essentially in the novel and peculiar combination of parts and details of construction, as hereinafter first fully set forth and described, and then pointed out in the claims.

Figure 1:
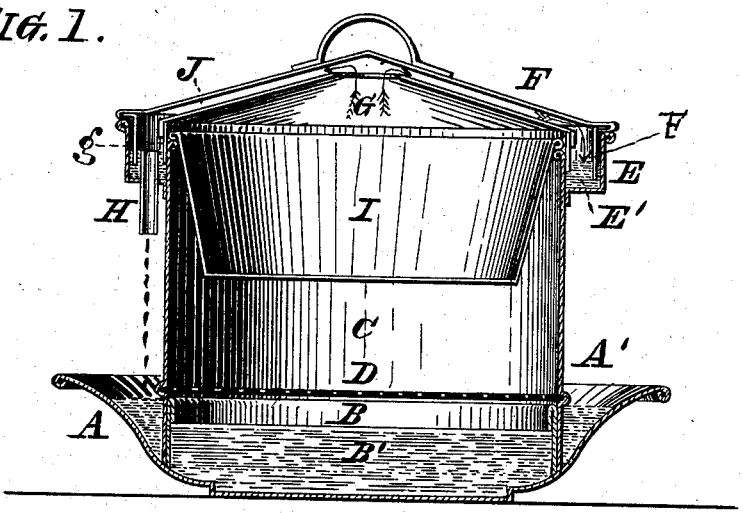
Figure 2:
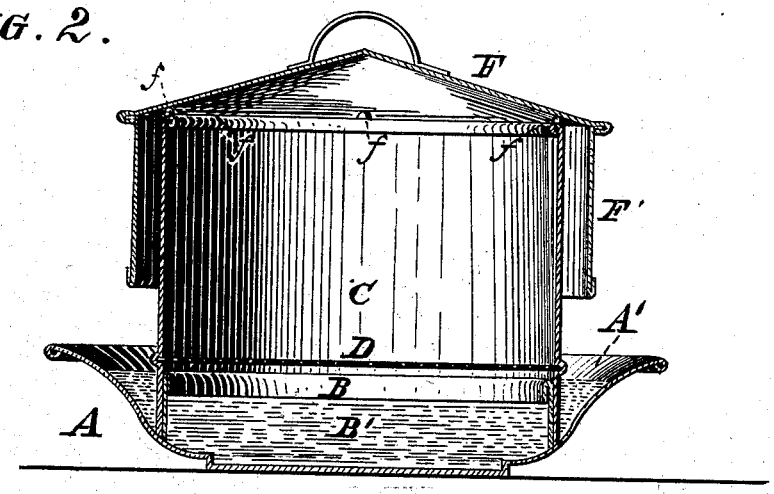

In the drawings already mentioned, which serve to illustrate my said invention more fully, Figure 1 is a longitudinal sectional elevation of my improved culinary steamer. Fig. 2 is a similar view, illustrating a modification of my said device.

Like parts are designated by corresponding letters of reference in all the figures.

A indicates a water receptacle or bowl for my improved culinary boiler and steamer. It is constructed in any convenient and improved manner, and preferably produced seamless by the process of draw and drop stamping. Within this bowl I provide a rim, B, of suitable diameter, the upper edge of which is somewhat lower than the upper edge of the bowl A, as clearly shown in the drawings.

Over the rim B is fitted the vessel C, consisting of a cylindrical shell having a perforated diaphragm or bottom, D, near its lower edge and a series of projections, *f*, on its upper edge, said projections preventing a cover, F, from resting upon said upper edge.

Around the shell C, I provide a gallery or gutter, E, for the reception of the comparatively deep rim F' of the cover F, and in the said gutter E, I provide an overflow-pipe, H, the upper end of which is slightly lower than the upper edge of the said shell C.

Over the shell C is fitted (snugly, by preference) a cone or deflector, G, having its rim *g* arranged so as to be lower than the upper edge of the overflow-pipe H, already mentioned. In the interior of the shell are fitted one or more cooking-vessels, I, of any construction.

In operation the bowl A is filled with water in such manner that the space A' outside of the rim B is filled to overflow said rim, while the interior space, B', receives the necessary quantity to produce good results in steaming and cooking. Now the shell C, with its contents, is placed over the rim B, so that its lower edge is submerged in the water outside of said rim at A'. Now water is poured into the gutter E until it overflows at H, and the apparatus placed upon the stove, range, &c., for boiling, &c. As soon as evaporation takes place the rising steam passes through the aperture in the apex of the cone G downward in the space J, where it is condensed by meeting the cool surface of the cover F, and gathers in the space E' of the gutter E, and overflows through the pipe H to return to the space A. Here it overflows over the rim B, and thereby returns back to its original place, to be again converted into steam and started on its circuitous route.

It will now be readily observed that, on account of the introduction of the annular water-reservoirs A' and E', the vessel C, with its cover F, is perfectly water-sealed, thus not only preventing any steam from rising into the room, but also effectually avoiding any smell or unpleasant odor emitted by certain kinds of food when being cooked.

It will be further observed that by the device described there is practically no loss of water during cooking, which will therefore avoid "burning" of the food, which often takes place if the cook is not very careful in supplying his or her cooking utensils with the necessary water.

For a cheap apparatus I may dispense with the water-seal on the upper end of the vessel C for the cover F. In this case I shall, by preference, make the rim F' of said cover F very deep, so as to increase the condensing-surface sufficiently to prevent escape of steam, and I may even increase this depth to such an extent as to cause the lower edge of said cover to dip down into the annular water-space A', thus producing at once a seal for both the shell C and cover F without the use of the gutter E.

It is perfectly obvious that several of the shells C, with the gutters E, may be placed one onto the other and all be perfectly sealed in a manner readily comprehended.

I have heretofore mentioned the projections or beads $f$ on the upper edge of the shell C. These projections serve as resting-points for the vessel I, so as not to close the said shell C on its upper end sufficiently to prevent escape of steam from said shell C into the space J, which might take place were the bead of said vessel I to rest upon the upper edge of said shell C, although it is not probable that, with ordinary workmanship, such as is bestowed upon tinware, such a close fit would be attained as to close the shell C steam-tight by the insertion of the vessel I.

I have also mentioned the fact that the shell C fits over the rim B in the bowl A, and that, furthermore, the water in the annular space A' overflows into the space B'. Bearing in mind the fact already mentioned, that tinware is never fitted together in such manner as to produce water or steam tight joints without the aid of double-seaming or soldering, it will be perfectly evident that, although the vessel C is shown to be in close contact with the rim B, the fit of the said vessel over said rim is not calculated to be such as to prevent said water from passing between the shell and the rim; nor could a tight fit, so as to prevent passage of water, as described, be produced, even if it were desired to do so, without the use of some cement to render said joint water or gas tight.

Having thus fully described my invention, I claim as new and desire to secure by Letters Patent of the United States—

1. The combination, with the bowl A, having the rim B, of the vessel C, with the diaphragm D and gallery E, with overflow H, cone G, and cover F, with the deep rim F', the whole being constructed and combined substantially as and for the use and purpose indicated.

2. As an improved article of manufacture, a culinary boiler consisting essentially of a bowl having an annular rim, B, the upper edge of which is lower than the upper edge of the said bowl, so as to allow the contents of the annular space A', produced by said rim or flange B, to overflow into the space B', as specified, and the vessels C and I and the cover J, the whole being constructed and combined substantially in the manner as and for the object specified.

3. In a culinary boiler, the combination, with the bowl A, having the rim B, constructed as specified, of the vessel C, having the gallery E, with overflow-pipe H, vessel I, and cover G, whereby the steam rising from said bowl A and vessel I is condensed and conducted back into the space B' in said bowl A, substantially in the manner and for the object stated.

In testimony that I claim the foregoing as my invention I have hereto set my hand in the presence of two subscribing witnesses.

JOHN KREHBIEL.

Attest:
MICHAEL J. STARK,
JOHN C. DUERR.